United States Patent
Lux et al.

(10) Patent No.: US 10,569,897 B2
(45) Date of Patent: Feb. 25, 2020

(54) METHOD FOR COMPUTING AND DISPLAYING PILOTING INFORMATION INCLUDING A "RELIEF FACTOR"

(71) Applicant: THALES, Courbevoie (FR)

(72) Inventors: Johanna Lux, Merignac (FR);
Emmanuel Monvoisin, Merignac (FR);
Siegfried Rouzes, Merignac (FR)

(73) Assignee: THALES, Courbevoie (FR)

( * ) Notice: Subject to any disclaimer, the term of this patent is extended or adjusted under 35 U.S.C. 154(b) by 53 days.

(21) Appl. No.: 15/846,013

(22) Filed: Dec. 18, 2017

(65) Prior Publication Data
US 2018/0194486 A1    Jul. 12, 2018

(30) Foreign Application Priority Data
Dec. 29, 2016   (FR) .................................. 16 01893

(51) Int. Cl.
*B64D 43/00* (2006.01)
*G01C 23/00* (2006.01)
*G06F 3/147* (2006.01)

(52) U.S. Cl.
CPC ........... *B64D 43/00* (2013.01); *G01C 23/005* (2013.01); *G06F 3/147* (2013.01); *G09G 2340/0414* (2013.01); *G09G 2340/125* (2013.01); *G09G 2380/12* (2013.01)

(58) Field of Classification Search
CPC .... B64D 43/00; G01C 11/06; G01C 21/3635; G01C 23/00; G01C 23/005; G06F 3/147; G06T 11/60; G06T 19/006; G08G 5/0021; G09B 9/301; G09G 5/38; G09G 2340/0414; G09G 2340/125; G09G 2380/12

USPC ......................................................... 340/975
See application file for complete search history.

(56) References Cited

U.S. PATENT DOCUMENTS

| 5,793,350 | A | * | 8/1998 | Chandavarkar | ........ | G09G 5/005 |
| | | | | | | 345/667 |
| 7,825,831 | B2 | | 11/2010 | Namier et al. | | |
| 8,159,416 | B1 | | 4/2012 | Yum et al. | | |
| 8,344,911 | B1 | | 1/2013 | Wenger et al. | | |
| 8,514,266 | B2 | * | 8/2013 | Wilson | .................... | G06T 3/005 |
| | | | | | | 348/42 |
| 2002/0145543 | A1 | * | 10/2002 | Hausmann | ............. | G01C 23/00 |
| | | | | | | 340/975 |

(Continued)

FOREIGN PATENT DOCUMENTS

| EP | 2 244 239 A2 | 10/2010 |
| EP | 2 827 105 A1 | 1/2015 |

*Primary Examiner* — Stephen R Burgdorf
(74) *Attorney, Agent, or Firm* — Baker & Hostetler LLP

(57) ABSTRACT

A method is provided for two-dimensional graphic representation on an aircraft display screen of an image or of a symbol or of a symbology ($P_E$) whose three-dimensional coordinates in a terrestrial reference frame are known. The graphic representation of the object or of the symbol is stretched in a vertical axis by a constant factor ($\alpha$) lying between 1.0 and 1.2, the stretching having, for its neutral plane, the local horizontal geographic plane containing the aircraft. Furthermore, when the symbology is a pitch scale consisting of graduations, two successive graduations being separated by a constant angular value, the graphic representations of two successive graduations of the pitch scale are separated by a constant distance on the display screen.

7 Claims, 2 Drawing Sheets

(56) References Cited

U.S. PATENT DOCUMENTS

| | | | | |
|---|---|---|---|---|
| 2009/0310858 A1* | 12/2009 | Jupe | ................... | H04N 13/122 |
| | | | | 382/167 |
| 2014/0245232 A1* | 8/2014 | Bailiang | ............ | G06F 3/04815 |
| | | | | 715/850 |
| 2015/0019048 A1* | 1/2015 | Krishna | ................ | B64D 45/00 |
| | | | | 701/4 |
| 2015/0348299 A1* | 12/2015 | Ott | ...................... | G01C 23/005 |
| | | | | 345/632 |
| 2016/0377862 A1* | 12/2016 | Zimmerman | ...... | G02B 27/0101 |
| | | | | 359/567 |
| 2017/0010792 A1* | 1/2017 | Stewart | .............. | G06F 3/04845 |
| 2018/0182140 A1* | 6/2018 | Biradar | .................. | G06T 11/60 |

* cited by examiner

METHOD FOR COMPUTING AND DISPLAYING PILOTING INFORMATION INCLUDING A "RELIEF FACTOR"

CROSS-REFERENCE TO RELATED APPLICATIONS

This application claims priority to foreign French patent application Nos. FR 1601893, filed on Dec. 29, 2016, the disclosures of which are incorporated by reference in their entirety.

FIELD OF INVENTION

The general field of the invention is that of the display of symbologies or real or synthetic images of the outside landscape in an aircraft display system. These synthetic imaging systems are known by the acronym "SVS", meaning "Synthetic Vision System".

BACKGROUND

This synthetic image is represented in three-dimensional projections so as to best correspond to the reality of the outside landscape.

This image generally includes piloting and navigation information known by the acronym "PFD", meaning "Primary Flight Display". Such information comprises, in particular, a scale representative of the pitch of the aircraft known by the term "pitch scale" as well as a symbol representative of the direction of the aircraft known by the acronym "FPV", meaning "Flight Path Vector". The image is generally displayed on the display screens of the aircraft instrument panel. FIG. 1 schematically represents this type of display in which there are a dotted-line representation of the outside landscape T, a pitch scale $P_E$ represented by graduations and a symbol A of the FPV.

The graphic representation of information superimposed on the representation of the outside landscape poses a certain number of problems.

The first problem is that the perfect three-dimensional projection of a landscape is not necessarily perceived as such by the pilot. To counter this difficulty, the patent U.S. Pat. No. 8,159,416 entitled "Synthetic vision dynamic field of view" describes a dynamic change of the field of view, or "FOV", the acronym "Field Of View", to have a better knowledge of the situation as a function of the speed of the aeroplane or of its altitude. For example, the FOV increases when the aeroplane is on the ground such that the pilot can see more widely to the sides and the FOV decreases at altitude. This system therefore allows the field of view to be zoomed without deformations. This solution only imperfectly resolves the absence of realistic aspect of the outside landscape or perceived as such.

A second problem is the display of the piloting information and, in particular, of the pitch scale when it has to be superimposed on the synthetic image of the outside landscape. In the absence of SVS representation, the pitch scale, which consists of graduations, is generally linear, that is to say that the spacings of its graduations are constant.

In an SVS representation, this linear representation can no longer conform, that is to say be perfectly superimposed on the landscape represented on the screen. Indeed, the principles of graphic generation of a three-dimensional or 3D image on a screen involves a projection of the 3D image in a two-dimensional plane. The result thereof is a deformation of the 3D scene displayed on the screen according to a law proportional to the tangent function. According to this principle, a three-dimensional object representing a linear scale becomes a nonlinear scale once projected into a plane. One way to resolve the problem is to modify the pitch scale by the application of the projection function, proportional to the tangent function. The patents U.S. Pat. No. 8,344,911 entitled "System, module, and method for generating non-linearly spaced graduations for a symbolic linear scale" and U.S. Pat. No. 7,825,831 "Aircraft flight display with a non-linear pitch scale" describe solutions of this type. These presentation methods do not make it possible to ensure both a satisfactory synthetic image presentation and an undistorted superimposition of the pitch scale.

SUMMARY OF THE INVENTION

The two-dimensional graphic representation method according to the invention does not present these drawbacks. It consists in stretching the terrain in its vertical dimension by the application of a scale factor called "Relief Factor" and simultaneously applying a correction of the linear pitch scale making it possible to correspond to the deformation of the terrain, this correction being a function of the pitch value of the aeroplane model. More specifically, the subject of the invention is a method for two-dimensional graphic representation on an aircraft display screen of an image or of a symbol or of a symbology whose three-dimensional coordinates in a terrestrial reference frame are known, characterized in that the graphic representation of said object or of said symbol is expanded in a vertical axis by a constant factor ($\alpha$), said expansion having, for its neutral plane, the local horizontal geographic plane containing the aircraft.

Advantageously, said symbology is a pitch scale consisting of graduations, two successive graduations being separated by a constant angular value, characterized in that the graphic representations of two successive graduations of the pitch scale are separated by a constant distance on the display screen, said distance being proportional to the product of the constant factor ($\alpha$) by a second factor ($\beta$), the second factor ($\beta$) depending on the instantaneous angle of elevation (S) of the aircraft according to the expression:

$$\beta = \frac{1 + \tan^2(S)}{1 + \alpha^2 \tan^2(S)}$$

Advantageously, the graphic representation including a symbol representative of the trajectory of the aircraft, the vertical coordinate of the symbol in a terrestrial reference frame is multiplied by the constant factor ($\alpha$) before passage into the reference frame of the aircraft and projection on the display screen.

Advantageously, the pitch scale is superimposed on a synthetic representation of the outside landscape, said synthetic representation of the outside landscape being expanded by the constant factor being expanded by the constant factor ($\alpha$) in a terrestrial vertical axis.

Advantageously, the symbol relates to the pitch scale or is a navigation marker.

Advantageously, the image is derived from an image sensor.

Advantageously, the constant factor ($\alpha$) lies between 1.0 and 1.2.

Advantageously, the display screen is an opaque or semi-transparent instrument panel screen or a screen of a head-up display device.

BRIEF DESCRIPTION OF THE DRAWINGS

The invention will be better understood and other advantages will become apparent on reading the following description given in a nonlimiting manner and from the attached figures in which.

DETAILED DESCRIPTION

The method according to the invention is implemented in an avionics system. The latter conventionally comprises:

sensors that make it possible to know the position in space and the attitude of the aircraft. They are for example a satellite geolocation system or an inertial unit;

a mapping database of data representative of the terrain flown over;

a graphic computer making it possible to compute, from the preceding data, a graphic image;

one or more display devices mounted on the instrument panel and/or in head-up configuration.

The method according to the invention requires computations which are essentially computations of change of three-dimensional or two-dimensional reference frame. These computations can easily be executed in real time by the appropriate software by the computers on board the craft. The computations performed by this software are detailed hereinbelow.

For a semi-transparent display system such as the head-up display systems or the systems with projection onto the windscreen, a projected symbol is said to be conformal if it denotes a point, a shape or a vector which represents a physical element perfectly superimposed on the real scene. As an example, the point can be an aim or another carrier, the shape can be a flight plan or a landing runway, the vector can represent the speed of the craft or a setpoint direction. The projected symbol is then the trace on the display screen of the three-dimensional object.

Figure 1:
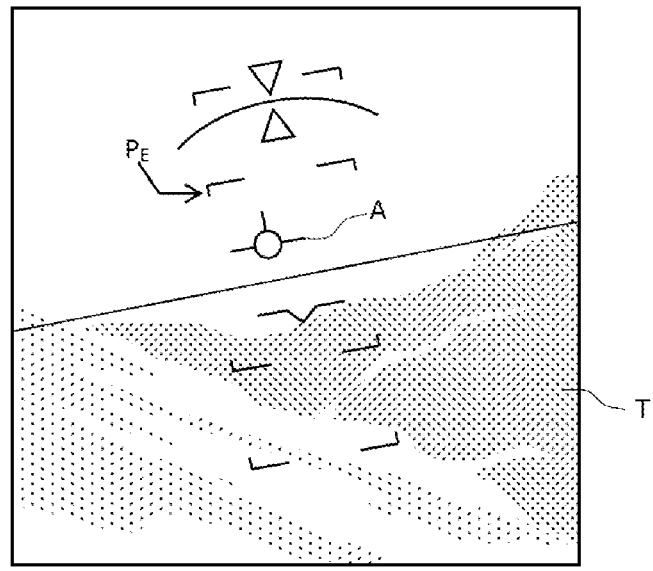
FIG. 1, already discussed, schematically represents the display of an SVS image comprising a piloting symbology.
Figure 2:
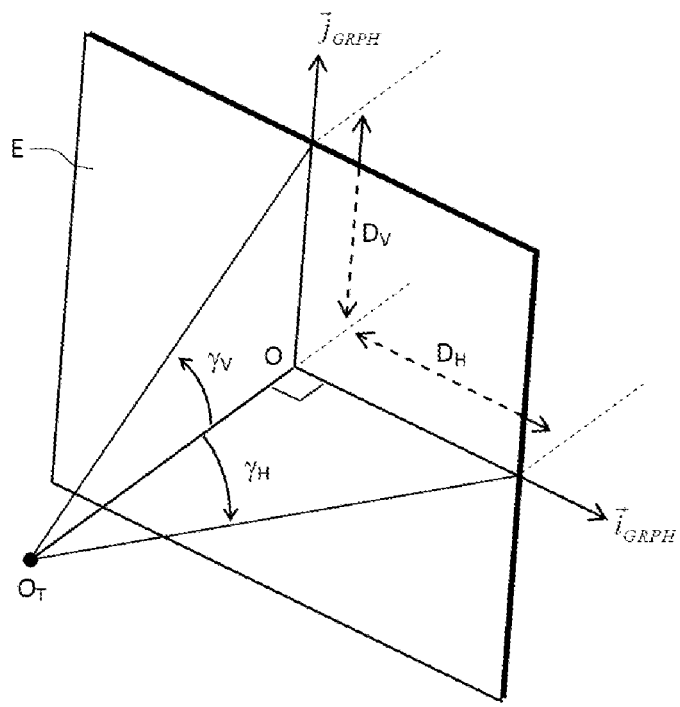
FIG. 2 represents the conformal projection metric of a field expressed in angular coordinates on a two-dimensional flat screen.

By extension, the expression conformal projection for a non-transparent display screen is used when wanting to give the impression of a three-dimensional scene representation. The conformal projection system then consists of a useful part of the screen with which are associated fields of view, that is to say a horizontal field and a vertical field. FIG. 2 represents this type of projection onto a screen E. This screen E has the point O for its centre, $D_H$ is its half-length and $D_V$ is its half-height. This screen is supposed to represent an angular field whose angular half-width $\gamma_H$ corresponds to the half-length $D_H$ and whose angular half-height $\gamma_V$ corresponds to the half-height $D_V$. Its conformal metric focal length $f_m$ is the length $O_I O$. Its value is therefore:

$$f_m = \frac{D_H}{\tan\gamma_H} = \frac{D_V}{\tan\gamma_V}$$

Generally, the useful inputs for the screen E are the pixel coordinates. If the metric dimensions of the pixels are $\delta_H$ and $\delta_V$ and the number of pixels of the half-dimensions of the screen are H and V, then two focal lengths $f_H$ and $f_V$ are defined, expressed in pixels and linked to the metric focal length by the relationships:

$$f_m = f_H \delta_H = f_V \delta_V$$

In the current case of square pixels $\delta_H$ and $\delta_V$ are equal and, consequently, the focal lengths $f_H$ and $f_V$ are also equal. In this case, there needs to be consistency between the dimensions of the pixels and the associated fields according to the formula:

$$\frac{H}{V} = \frac{\tan\gamma_H}{\tan\gamma_V}$$

Figure 3:
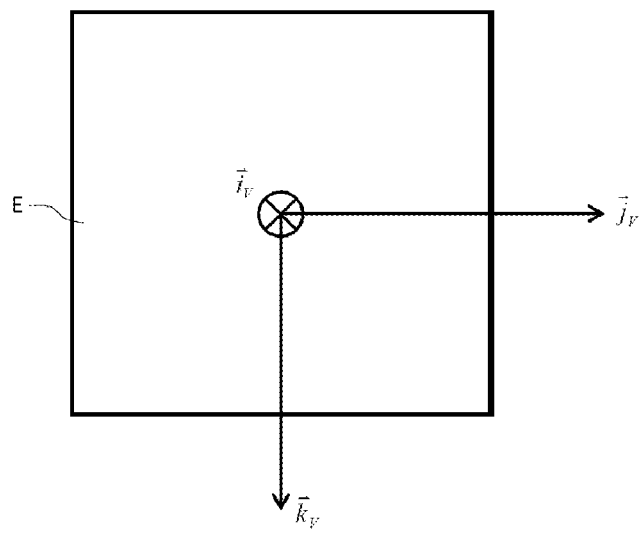
FIG. 3 represents a three-dimensional reference frame referenced in relation to a two-dimensional screen.

Given that, it is possible to define a three-dimensional reference frame $R_E(\vec{i}_V, \vec{j}_V, \vec{k}_V)$ linked to the preceding screen E. It is represented in FIG. 3. In this reference frame, a point P or a vector whose coordinates are $(X_V, Y_V, Z_V)$ is projected into the plane of the screen E at the point P' of coordinates:

$$x_H = f_H \cdot \frac{Y_V}{X_V} \text{ and } x_V = -f_V \cdot \frac{Z_V}{X_V}$$

When the screen is positioned in an aircraft, this latter reference frame $R_E$ coincides with that of the aircraft $R_{AV}$ and the following relationships apply:

$O_{AV}$: Aircraft origin $\vec{i}_{AV}$: Axis of the aircraft, positive forward $\vec{j}_{AV}$: Axis of the wings of the aircraft, positive to the right $\vec{k}_{AV}$: Vertical axis of the aircraft, positive downward It is then possible, knowing the coordinates of a point P in a terrestrial reference frame $R_{GEO}$, to determine these coordinates first of all in the reference frame of the aircraft and then in the two-dimensional reference frame of the screen E.

The local geographic reference frame is defined as follows:

$O_{GEO}$: Aircraft origin coinciding with $O_{AV}$ $\vec{i}_{GEO}$: North terrestrial tangent axis $\vec{j}_{GEO}$: East terrestrial tangent axis $\vec{k}_{GEO}$: Bottom terrestrial radial axis If the point P has the geographic coordinates $(X_{GEO}, Y_{GEO}, Z_{GEO})$, these coordinates in the three-dimensional reference frame of the screen are $(X_{AV}, Y_{AV}, Z_{AV})$. The change of coordinates is produced by the rotation matrix $\hat{R}$ according to the following relationship:

$$\begin{pmatrix} X_{AV} \\ Y_{AV} \\ Z_{AV} \end{pmatrix} = \hat{R}^T \cdot \begin{pmatrix} X_{GEO} \\ Y_{GEO} \\ Z_{GEO} \end{pmatrix}$$

In which the rotation matrix $\hat{R}$ is the rotation matrix of the carrier. It is, for example, derived from the Euler angles which are the bearing G, the elevation angle S and the roll R. In the case of an aircraft, the bearing corresponds to the heading of the aircraft and the elevation angle to its pitch. In this case, the matrix $\hat{R}$ has the value:

$$\hat{R} = \begin{pmatrix} \cos G \cdot \cos S & -\sin G \cdot \cos R + \cos G \cdot \sin S \cdot \sin R & \sin G \cdot \sin R + \cos G \cdot \sin R \cdot \cos R \\ \sin G \cdot \cos S & \cos G \cdot \cos R + \sin G \cdot \sin S \cdot \sin R & -\cos G \cdot \sin R + \sin G \cdot \sin S \cdot \cos R \\ -\sin S & \cos S \cdot \sin R & \cos S \cdot \cos R \end{pmatrix}$$

Having computed the coordinates ($X_{AV}$, $Y_{AV}$, $Z_{AV}$) in the reference frame of the aircraft, it is easy to determine the coordinates ($x_H$, $x_V$) of this same point in that of the screen E. They are:

$$x_H = f_H \cdot \frac{Y_{AV}}{X_{AV}} \text{ and } x_V = -f_V \cdot \frac{Z_{AV}}{X_{AV}}$$

These computation tools being established, it is possible to determine the plot of any object of known coordinates, such as, for example, a synthetic terrain on the screen.

It has been demonstrated that a slight deformation of the synthetic terrain in the vertical axis can give the pilot the impression of being more like the reality, that is to say more like the landscape seen through the windscreen.

The synthetic terrain representation according to the invention is therefore stretched in its vertical dimension by the application of a scale factor α called "Relief Factor". The aim of this coefficient is to emphasize the geographic relief effect such that the pilot has a better knowledge of the situation. This "Relief Factor" therefore deforms the landscape and the absolute conformity with the outside world. The effect of the Relief Factor is maximal when the carrier is horizontal, and is minimal when the carrier is vertical, when it is nose-down, for example.

The method according to the invention is not limited to the synthetic representations of the outside landscape. It can also be applied to real images derived from the onboard sensors such as the thermal cameras.

Obviously, the application of this Relief Factor can be applied, for immediate reasons of image superimposition issues, to semi-transparent screens only by taking the constant factor α equal to 1. Generally, the constant factor α lies between 1.0 and 1.2.

In the case of a constant factor α equal to 1, a sensor image derived, for example, from an infrared camera, without Relief Factor, is also conformal with the rest of the information displayed.

In the case of the display of a sensor image in head-down configuration on an opaque screen, it is possible to choose between two options:

Relief factor equal to 1 for all the information displayed, including the synthetic terrain, the pitch scale, etc. There is then no adaptation of the sensor image with a Relief Factor;

Relief factor different from 1. There is then adaptation of the sensor image with a Relief Factor.

Given a point M having as geographic coordinates ($X_{GEO}$, $Y_{GEO}$, $Z_{GEO}$) in the terrestrial reference frame $R_{GEO}$ as defined previously, these new coordinates are, after application of a Relief Factor α, ($X'_{GEO}$, $Y'_{GEO}$, $Z'_{GEO}$). These coordinates satisfy the following simple relationships:

$X'_{GEO} = X_{GEO}$ $Y'_{GEO} = Y_{GEO}$ $Z'_{GEO} = \alpha \cdot Z_{GEO}$

It is thus possible to plot on the display screen, in "expanded" representation, any object or symbol of known coordinates.

As a first example, to plot the projection of the speed vector FPV of the aircraft known in the geographic reference frame by taking the Relief Factor into account, the following steps are carried out:

computation of the rotation matrix of the aircraft taking the Relief Factor into account, computation of the coordinates of the FPV in the geographic reference frame by taking the Relief Factor into account;

change of reference frame of said coordinates to switch them into the three-dimensional reference frame of the screen;

projection of said coordinates into the two-dimensional reference frame of the screen.

As a second example, the Relief Factor can be applied to the pitch scale. The pitch scale is represented on a display device whose three-dimensional reference frame coincides with the reference frame of the aircraft. It is the projection of certain planes of the beam whose common axis is the horizontal straight line directed by the transverse axis of the carrier before the application of its roll. The projected planes are chosen in the beam according to the angle of their normal with the vertical, generally according to a linear angular progression, from −90° to +90° by constant steps. Generally, this step has a value of 10°.

More specifically, for a given angular value P, the pitch scale interval P is a segment of the straight line which is the two-dimensional projection of the plane defined by the rotation of angle P of the plane ($O_{AV}$, $\vec{i}_{GEO}$, $\vec{j}_{GEO}$) about the axis ($O_{AV}$, $\vec{j}'_{GEO}$) in which $\vec{j}'_{GEO} = -\sin G \cdot \vec{i}_{GEO} + \cos G \cdot \vec{j}_{GEO}$. Thus, with nil role, the central point of the scale interval is the two-dimensional projection of the vector whose geographic coordinates are:

$$\begin{pmatrix} \cos G \cdot \cos P \\ \sin G \cdot \cos P \\ -\sin P \end{pmatrix}$$

The best approximation for the coordinate $x_v$ of a scale interval of the linear pitch scale displayed in the presence of Relief Factor is:

$x_v = f_v \cdot k \cdot (P-S)$, P being the angle of elevation of the scale interval, S being the angle of elevation of the aircraft, (P−S) being expressed in radians and $$k = \alpha \cdot \frac{1 + \tan^2(S)}{1 + \alpha^2 \tan^2(S)}$$

if S is different from ±90° and $$k = \frac{1}{\alpha}$$

if S is equal to ±90°.

$\delta_P$ is used to denote the constant angular pitch between the planes of the pitch scale. Generally, this pitch has a value of 10 degrees. Thus, the two-dimensional pitch scale is indeed linear, in as much as the deviations between two scale intervals are all the same of pixel value $\Delta_P$ and have the value $f_v \cdot k \cdot \delta_P$. It is essential to note that, in this case, this common deviation value depends on the aeroplane angle of elevation S. It can therefore vary on each computation cycle.

The pitch scale is therefore no longer strictly conformal to the terrain. The conformity error is nil at the aeroplane model level, at the centre of the screen, and is maximum at the visible field edge of the pitch scale. This maximum error is low, since it is constantly compensated by the variable correction as a function of the pitch of the aeroplane model and this maximum error is more than acceptable if it is compared to the global uncertainty due, among other things, to the angle measurement uncertainty linked to the accuracy of the "AHRS" system, AHRS being the acronym for "Attitude and Heading Reference System", and to the conversion uncertainty on the display device.

As an example, for a Relief Factor of 1.2 and a visible range on the screen of the pitch scale of 25°, the maximum "non-conformity" error of the graduation furthest to the edge of the field is 0.16° for an aeroplane pitch of 0° and this error is 0.23° for an aeroplane pitch of 70°. This error level is perfectly acceptable.

Figures 4, 5:
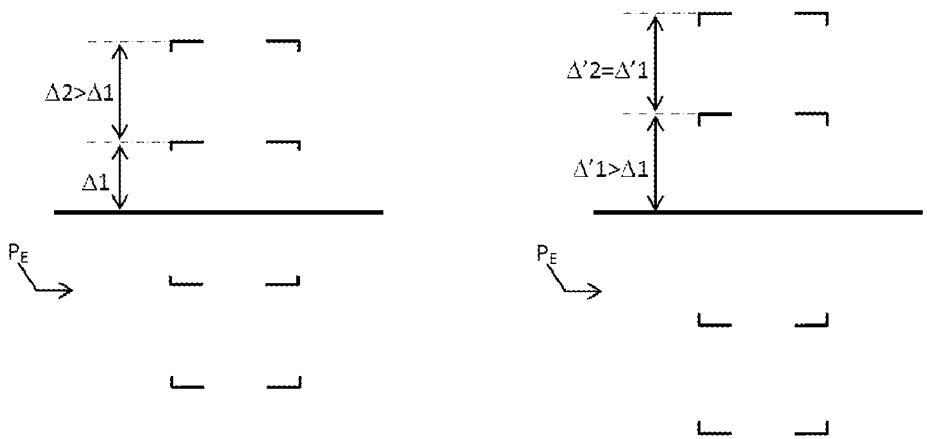
FIGS. 4 and 5 represent a pitch scale displayed according to the prior art and according to the invention.

FIGS. 4 and 5 represent the same pitch scale represented on a display screen according to the prior art in FIG. 4 and according to the invention in FIG. 5. In FIG. 4, Δ1 represents the deviation in pixels between the horizon and the first graduation of the pitch scale and Δ2 represents the deviation in pixels between the first graduation and the second graduation of the pitch scale. In as much as this second deviation conforms to the outside landscape, it is greater than the deviation Δ1. In FIG. 5, Δ'1 represents the deviation in pixels between the horizon and the first graduation of the pitch scale for an angular pitch identical to that of FIG. 4 and Δ'2 represents the deviation in pixels between the first graduation and the second graduation of the pitch scale. In as much as a Relief Factor has been applied, the deviation Δ'1 is greater than the deviation Δ1. However, the deviation Δ'2 is equal to the deviation Δ'1. It no longer conforms to the outside landscape but, as has been stated, the error remains acceptable.

According to the same principles, it is possible to deform any symbol attached to the pitch scale, but also the navigation reference frames that are the flight plan, the way points, the air traffic, etc.

The display screen can be an opaque or semi-transparent instrument panel screen or a screen of a head-up display device. In the latter case, the Relief Factor is necessarily equal to 1 to ensure the conformity of the superimposition of the synthetic image with the outside landscape, which gives, for a visible range on the screen of the pitch scale of 25°, a maximum "non-conformity" error of the graduation furthest to the edge of the field of 0.19° for an aeroplane pitch of 0° and an error of 0.19° for an aeroplane pitch of 70°. This error level is perfectly acceptable.

The invention claimed is:

1. A method for two-dimensional graphic representation on an aircraft display screen (E) of an outside landscape whose three-dimensional coordinates in a terrestrial reference frame are known, wherein the graphic representation of the outside landscape is stretched only in a vertical axis by a constant factor ($\alpha$), said stretching having, for its neutral plane, the local horizontal geographic plane containing the aircraft, said constant factor ($\alpha$) being different from 1 and lying between 1.0 and 1.2.

2. The graphic representation method according to claim 1, wherein a pitch scale ($P_E$) consisting of graduations is superimposed on the graphic representation of the outside landscape, two successive graduations being separated by a constant angular value, wherein the graphic representations of two successive graduations of the pitch scale are separated by a constant distance on the display screen, the distance being proportional to the product of the constant factor ($\alpha$) by a second factor ($\beta$), the second factor ($\beta$) depending on the instantaneous angle of elevation (S) of the aircraft according to the expression:

$$\beta = \frac{1 + \tan^2(S)}{1 + \alpha^2 \tan^2(S)}.$$

3. The graphic representation method according to claim 1, wherein the graphic representation includes a symbol (A) representative of the trajectory of the aircraft, and wherein the vertical coordinate of the symbol in the terrestrial reference frame is multiplied by the constant factor ($\alpha$) before passage into a reference frame of the aircraft and projection on the display screen.

4. The graphic representation method according to claim 3, wherein the symbol relates to a pitch scale.

5. The graphic representation method according to claim 3, wherein the symbol is a navigation marker.

6. The graphic representation method according to claim 1, wherein the graphic representation of the outside landscape is derived from an image sensor.

7. The graphic representation method according to claim 1, wherein the display screen is an opaque or semi-transparent instrument panel screen or a screen of a head-up display device.

* * * * *